United States Patent
Yuasa et al.

(10) Patent No.: US 11,770,993 B2
(45) Date of Patent: Oct. 3, 2023

(54) AGRICULTURAL FIELD WORK VEHICLE

(71) Applicant: KUBOTA CORPORATION, Osaka (JP)

(72) Inventors: Junichi Yuasa, Sakai (JP); Yushi Matsuzaki, Sakai (JP); Shinnosuke Ishikawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 334 days.

(21) Appl. No.: 16/973,805

(22) PCT Filed: Sep. 13, 2019

(86) PCT No.: PCT/JP2019/036089
§ 371 (c)(1),
(2) Date: Dec. 10, 2020

(87) PCT Pub. No.: WO2020/059653
PCT Pub. Date: Mar. 26, 2020

(65) Prior Publication Data
US 2021/0195823 A1 Jul. 1, 2021

(30) Foreign Application Priority Data

Sep. 19, 2018 (JP) ................................ 2018-175307

(51) Int. Cl.
*A01B 69/00* (2006.01)
*A01B 69/04* (2006.01)
*G05D 1/02* (2020.01)

(52) U.S. Cl.
CPC ......... *A01B 69/008* (2013.01); *G05D 1/0278* (2013.01); *G05D 2201/0201* (2013.01)

(58) Field of Classification Search
CPC .............. A01B 69/008; G05D 1/0278; G05D 2201/0201
See application file for complete search history.

(56) References Cited

U.S. PATENT DOCUMENTS

2017/0357269 A1 12/2017 Downing et al.
2018/0011495 A1 1/2018 Sakaguchi et al.

FOREIGN PATENT DOCUMENTS

EP 3473070 B1 * 1/2022 ............. A01B 69/00
JP 2008-092818 A 4/2008
(Continued)

OTHER PUBLICATIONS

WO-2015147224-A1 with English translation, published Oct. 1, 2015 (Year: 2015).*
(Continued)

*Primary Examiner* — Calvin Cheung
(74) *Attorney, Agent, or Firm* — KEATING AND BENNETT, LLP

(57) ABSTRACT

There is provided an agricultural field work vehicle capable of entering a work travel path intended by the driver in transition from manual turn travel to autonomous work travel. An agricultural field work vehicle includes an autonomous travel control section configured to cause the agricultural field work vehicle to perform autonomous travel on the basis of work travel paths and the position of the agricultural field work vehicle, a manual travel control section configured to control manual travel of the agricultural field work vehicle along a turn travel path, a destination travel path singling-out section configured to single out a destination work travel path from among a group of candidates of destination work travel paths that the agricultural field work vehicle is able to enter from the turn travel path through which the agricultural field work vehicle is driven manually, a notification device configured to notify the driver of path notification information, which is information on the work travel paths, which include the destination work travel path singled out, and an autonomous travel start operation tool for use to instruct the agricultural field work vehicle to switch (Continued)

from controlling the manual travel to controlling the autonomous travel.

5 Claims, 6 Drawing Sheets

(56) References Cited

FOREIGN PATENT DOCUMENTS

| | | |
|---|---|---|
| JP | 2016-021890 A | 2/2016 |
| JP | 2017-127290 A | 7/2017 |
| JP | 2017-136015 A | 8/2017 |
| JP | 2018-004589 A | 1/2018 |
| JP | 6320212 B2 | 5/2018 |

OTHER PUBLICATIONS

WO-2015147111-A1 with English translation, published Oct. 1, 2015 (Year: 2016).*
WO-2016076319-A1 with English translation, published May 19, 2016 (Year: 2016).*
Official Communication issued in International Patent Application No. PCT/JP2019/036089, dated Dec. 10, 2019.

* cited by examiner

AGRICULTURAL FIELD WORK VEHICLE

BACKGROUND OF THE INVENTION

1. Field of the Invention

The present invention relates to an agricultural field work vehicle capable of autonomous travel which agricultural field work vehicle travels along a plurality of work travel paths that are parallel to one another and that are connected to one another via turn travel paths.

2. Description of the Related Art

Agricultural field work vehicles of the above type cannot easily travel autonomously during turn travel as compared to during straight travel. Such an agricultural field work vehicle is normally allowed to travel autonomously during straight travel and driven manually during turn travel. To shift from manual turn travel to autonomous straight travel smoothly, an agricultural field work vehicle needs to have a vehicle body position and a vehicle body orientation each within a predetermined range.

If it is the driver that switches between manual travel and autonomous travel, the driver needs to check whether the vehicle body position and the vehicle body orientation are appropriate. Japanese Unexamined Patent Application Publication, *Tokukai*, No. 2016-21890 discloses an agricultural field work vehicle arranged for the checking to display on a monitor screen (i) an image of a travel path targeted for autonomous travel and (ii) a vehicle body symbol that allows the driver to check the orientation of the vehicle body relative to the target travel path. This allows the driver to look at the monitor screen and steer the agricultural field work vehicle so that the vehicle body is oriented appropriately for smooth transition from manual travel to autonomous travel. The agricultural field work vehicle includes a control unit that has the functions of (i) determining on the basis of a signal from a positioning sensor whether the agricultural field work vehicle has a vehicle body orientation that allows smooth transition from manual travel to autonomous travel and (ii) notifying the driver that the driver is allowed to end manual travel and start autonomous travel. In response to such a notification from the control unit, the driver operates a button for ending manual travel and starting autonomous travel.

SUMMARY OF THE INVENTION

The agricultural field work vehicle disclosed in Japanese Unexamined Patent Application Publication, *Tokukai*, No. 2016-21890 is arranged to, when the control unit determines whether the agricultural field work vehicle has a vehicle body orientation suitable for transition from manual travel to autonomous travel, check the vehicle position and vehicle orientation relative to a work travel path, or two or more work travel paths, set for autonomous travel. If a work target area includes a plurality of parallel work travel paths preset for autonomous travel, the driver is unable to know which of the plurality of work travel paths the control unit has selected as the destination. In particular, if the agricultural field work by the agricultural field work vehicle is tillage work by a tractor or harvesting work by a combine, the agricultural field work vehicle tends to set a plurality of work travel paths at intervals according to the work width and, after ending travel along a work travel path, skip one or more work travel paths before entering a subsequent work travel path. If in such cases, the driver has operated a switch for ending manual travel and starting autonomous travel in response to a notification that the driver is allowed to do so, the vehicle body may inconveniently enter a work travel path through autonomous travel which work travel path is other than the work travel path that the driver has intended.

Preferred embodiments of the present invention provide an agricultural field work vehicle capable of entering a work travel path intended by the driver in transition from manual turn travel to autonomous work travel.

An agricultural field work vehicle according to the present invention is an agricultural field work vehicle configured to perform autonomous travel along a plurality of work travel paths that are parallel to one another and that are connected to one another via a turn travel path, the agricultural field work vehicle including: a vehicle position calculating section configured to calculate a position of the agricultural field work vehicle and an orientation of the agricultural field work vehicle; an autonomous travel control section configured to cause the agricultural field work vehicle to perform the autonomous travel along the plurality of work travel paths on a basis of the plurality of work travel paths and the position of the agricultural field work vehicle; a manual travel control section configured to control manual travel of the agricultural field work vehicle along the turn travel path; a destination travel path singling-out section configured to single out a destination work travel path, which is a path targeted for a subsequent performance of the autonomous travel, from among one or more candidates among the plurality of work travel paths, which one or more candidates the agricultural field work vehicle is able to enter from the turn travel path; a notification information generating section configured to generate path notification information, which is information on the plurality of work travel paths, which include the destination work travel path singled out by the destination travel path singling-out section; a notification device configured to notify a user of the path notification information; and an autonomous travel start operation tool for use to instruct the agricultural field work vehicle to switch from controlling the manual travel to controlling the autonomous travel.

With the above arrangement, if the agricultural field work vehicle has a plurality of work travel path candidates that the agricultural field work vehicle is able to enter when exiting a turn travel path (through which the agricultural field work vehicle is driven manually) and entering a work travel path (through which the agricultural field work vehicle travels autonomously), the notification device notifies the driver of those work travel path candidates, which include a destination work travel path singled out by the destination travel path singling-out section as a path targeted for autonomous travel. If the destination work travel path singled out by the destination travel path singling-out section is a path intended by the driver, the driver operates the autonomous travel start operation tool to cause the agricultural field work vehicle to start autonomous travel to the destination work travel path intended.

If work travel paths set by a path setting section do not have specified travel directions, the destination travel path singling-out section may single out, as a path targeted for autonomous travel, a work travel path candidate that the agricultural field work vehicle is able to enter in a travel direction opposite to the travel direction intended by the driver. If in such a case, the driver operates the autonomous travel start operation tool inattentively, the vehicle body will inconveniently travel autonomously in a direction opposite to the direction intended by the driver. A preferred embodiment of the present invention is thus further arranged such that the path notification information includes information on a direction of entry of a vehicle body of the agricultural field work vehicle into the destination work travel path. This allows the driver to, before operating the autonomous travel start operation tool, know as a result of notification of path notification information the direction in which the vehicle body will travel to enter the destination work travel path through autonomous travel. This in turn allows the driver to avoid unintendedly letting the vehicle body travel in the opposite direction.

A preferred embodiment of the present invention further includes: a user operation device configured to generate an entry direction reversing instruction for reversing the direction of the entry of which direction the notification device has notified the user. With this arrangement, if the driver has noticed as a result of notification of path notification information that the vehicle body will enter (and travel along) the destination work travel path in a direction opposite to the direction intended by the driver, the driver can enter an entry direction reversing instruction to change the entry direction to the direction intended by the driver.

The notification device can understandably and reliably notify the driver of the path notification information effectively with use of graphics, for example. The notification device is thus preferably a display. Further, the driver can enter instructions to the control system of the agricultural field work vehicle preferably through a graphic interface. A preferred embodiment of the present invention is thus further arranged such that the notification device and the user operation device are combined with each other in a form of a single touch screen.

As described above, a tractor or combine for agricultural field work travels through parallel work travel paths typically not one by one in the order of their arrangement, but while skipping a number of work travel paths next to the originating work travel path to select the destination work travel path. The number of work travel paths to be skipped depends on, for example, the agricultural field conditions, work conditions, and/or the skill of the driver. This means that the destination travel path singling-out section may not necessarily single out a destination work travel path intended by the driver. In such cases, the driver needs to cancel the destination work travel path singled out by the destination travel path singling-out section and select a different work travel path as the destination work travel path. To make this possible, a preferred embodiment of the present invention is further arranged such that the destination work travel path singled out by the destination travel path singling-out section is changed to another work travel path among the one or more candidates in response to a user operation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
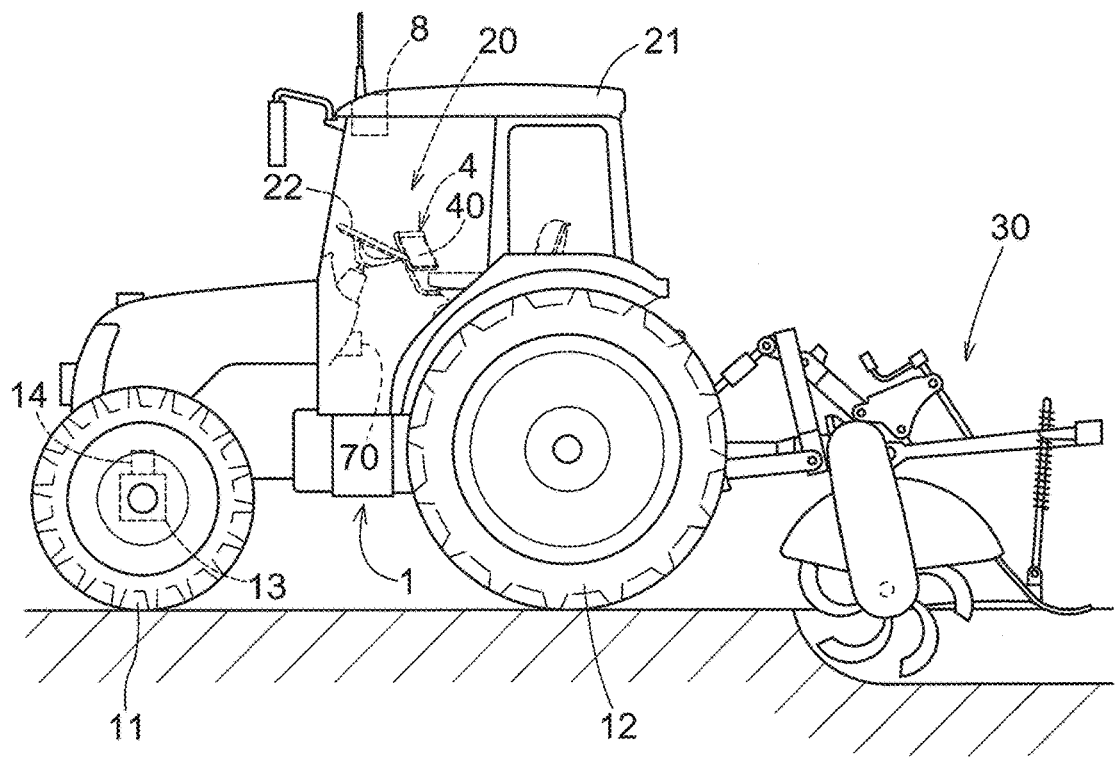
FIG. 1 is a side view of a tractor including an autonomous travel system mounted therein.

The description below deals with an agricultural field work vehicle capable of autonomous travel as a preferred embodiment of the present invention with reference to drawings. FIG. 1 is a side view of a tractor as an example of such an agricultural field vehicle. As illustrated in FIG. 1, the tractor includes front wheels 11, rear wheels 12, a vehicle body 1 supported by the front wheels 11 and the rear wheels 12, and a cab 20 at a central portion of the vehicle body 1. The tractor is provided with a rotary tiller device 30 (work device) attached to a back portion of the vehicle body 1 via a hydraulic lifting/lowering mechanism. The front wheels 11 function to steer the tractor; changing their steering angle changes the direction in which the tractor travels. The steering angle of the front wheels 11 is changed through operation of a steering mechanism 13. The steering mechanism 13 includes a steering motor 14 for autonomous travel. During manual travel, the front wheels 11 are controlled through operation of a steering wheel 22 provided in the cab 20. The tractor is provided with a vehicle position detecting module 8 to detect the position of the tractor. The vehicle position detecting module 8 includes a satellite navigation unit 81 (see FIG. 7) and an inertial navigation unit 82 (see FIG. 7). The satellite navigation unit 81 includes, as an element thereof, a satellite antenna attached to a top face of a cabin 21 to receive global navigation satellite system (GNSS) signals (including GPS signals). The inertial navigation unit 82 includes a gyroscopic acceleration sensor and a magnetic direction sensor both incorporated therein. The satellite navigation unit 81 and the inertial navigation unit 82 function together to generate positioning data for use in calculating the position of the tractor. Alternatively, only either the satellite navigation unit 81 or the inertial navigation unit 82 may help measure the position of the tractor for autonomous travel. The cab 20 contains a general-purpose data processing terminal 4. The data processing terminal 4 is a tablet computer including a touch screen 40 that functions as a user operation device and a notification device. The data processing terminal 4 receives various operations entered by the driver via the touch screen 40 and notifies the driver of various pieces of information.

Figure 2:
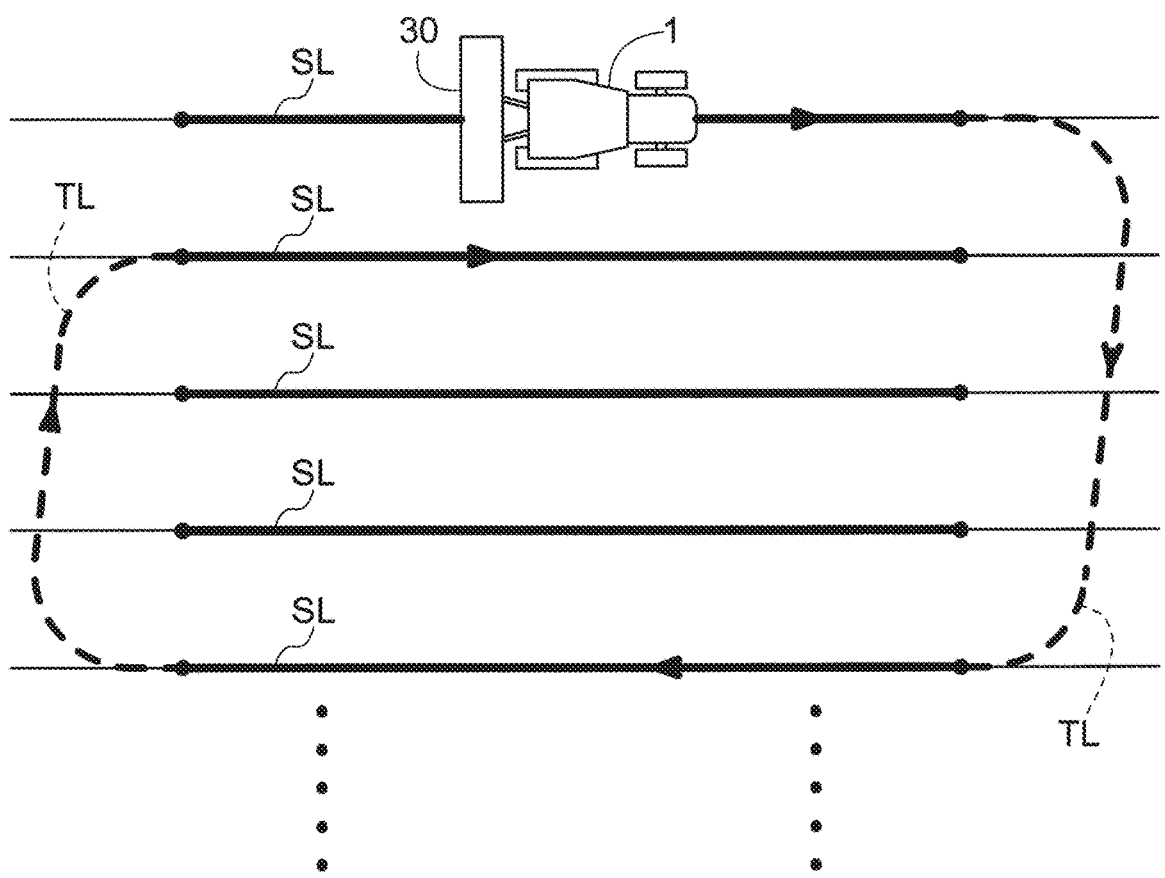
FIG. 2 is a diagram schematically illustrating work travel paths along which a tractor travels autonomously and turn travel paths along which a tractor is driven manually.

FIG. 2 schematically illustrates an example travel path for work travel of a tractor which work travel combines autonomous travel and manual travel. FIG. 2 shows a plurality of linear work travel paths SL set on an agricultural field in such a manner as to be parallel to one another at path intervals calculated on the basis of the work width of the tiller device 30. The drawing also shows turn travel paths TL, each of which is a travel path through which the tractor travels from one work travel path SL to another. The tractor repeats work travel, during which it drives itself autonomously along a work travel path SL, and turn travel, during which it is driven manually such as along a turn travel path TL. Turn travel typically includes in-between travel along one or more linear travel paths. The work travel paths SL are each in a straight line or a gentle curve. While traveling along each work travel path SL, the tractor performs tillage work over a work zone indicated in the drawing with two black dots with use of the tiller device 30 having been lowered. The tractor lifts the tiller device 30 to stop tillage work before turn travel.

Figure 3:
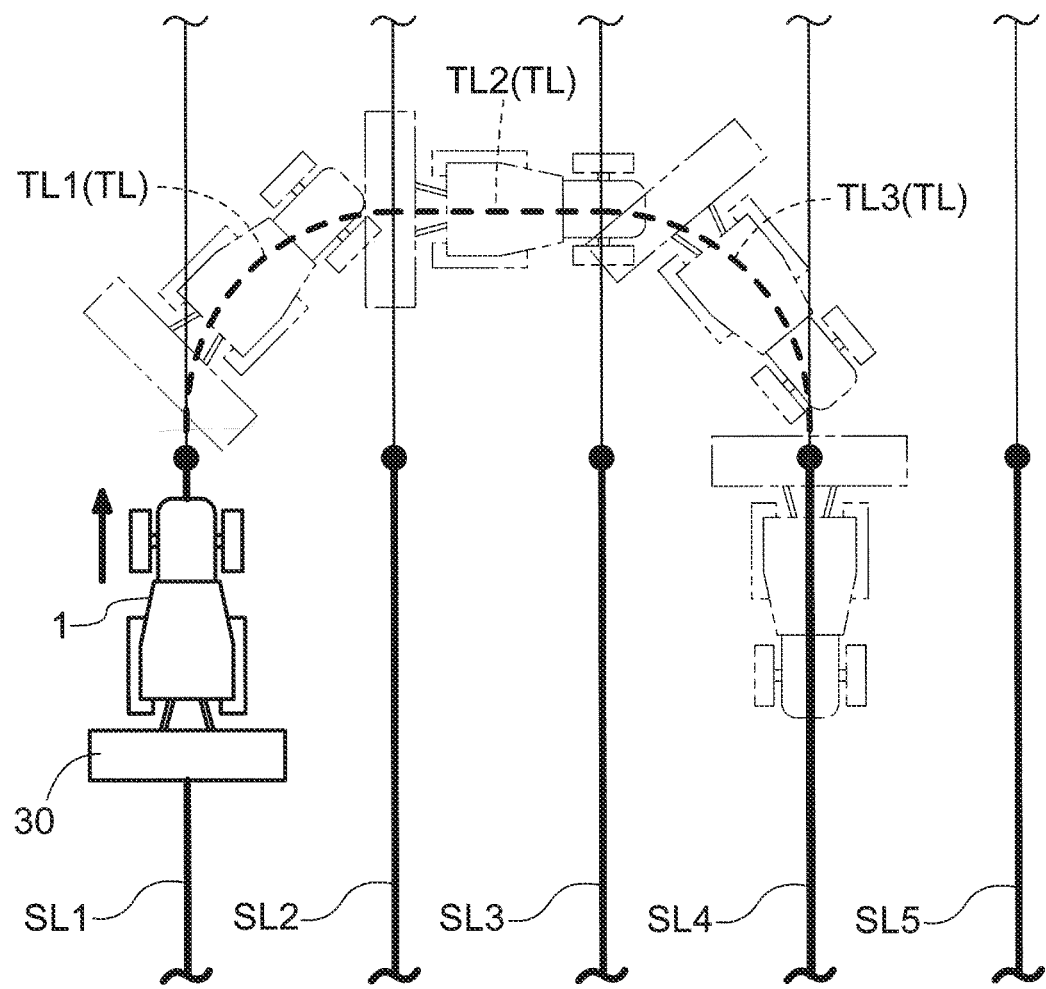
FIG. 3 is a diagram schematically illustrating how a tractor is driven manually during turn travel after ending autonomous travel along the originating travel path and before starting autonomous travel along a destination work travel path.

FIG. 3 shows reference signs SL1, SL2, SL3, SL4, and SL5 assigned to different work travel paths SL from left to right for distinction. FIG. 3 schematically illustrates a travel path of a tractor that ends work travel along the work travel path SL1 and that enters a subsequent work travel path SL4. The work travel path SL1 is referred to as the originating work travel path, whereas the work travel path SL4 is referred to as the destination work travel path. The originating work travel path SL1 is connected to the destination work travel path SL4 via a turn travel path TL, which is divided for convenience of description into a first turn travel path TL1, a second turn travel path TL2, and a third turn travel path TL3. The first turn travel path TL1 is constituted of (i) a short, linear travel path as a portion of an extension of the originating work travel path SL1 and (ii) a travel path curved toward the destination work travel path SL4. The second turn travel path TL2 extends in a straight line or a curve in a direction substantially orthogonal to the work travel paths SL. The third turn travel path TL3 is constituted of (i) a travel path curved in such a manner as to merge into the destination work travel path SL4 and (ii) a short, linear travel path as a portion of an extension of the destination work travel path SL4.

The linear travel path included in the first turn travel path TL1 is for the tiller device 30 (which is attached to a back portion of the vehicle body 1) to pass through a tillage work target zone along the originating work travel path SL1. The linear travel path included in the third turn travel path TL3 is for the tiller device 30 to correct its misorientation with respect to the destination work travel path SL4 before entering a tillage work target zone.

Typically, the driver drives the tractor manually through the first turn travel path TL1 to a position along the third turn travel path TL3, where the tractor becomes oriented to be able to travel autonomously. The driver then instructs the tractor to start autonomous travel, so that the tractor travels autonomously. This allows the tractor to enter the destination work travel path SL4 while traveling autonomously.

Figure 4:
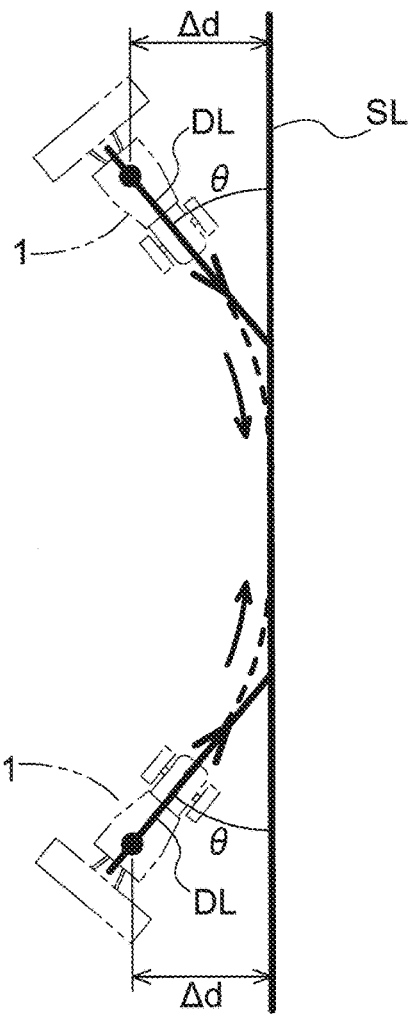
FIG. 4 is a diagram illustrating the entry angle for a tractor with respect to the destination work travel path.

With reference to FIG. 4, the description below deals with orientation of a tractor which orientation allows the tractor to travel autonomously. FIG. 4 shows direction lines DL for a tractor each of which direction lines DL extends in the front-back direction of the vehicle body 1 through the center of gravity of the vehicle body 1 (or a turn base point; indicated with a black dot in FIG. 4). The drawing also shows arrows each indicative of the direction in which the tractor travels. A work travel path SL and a direction line DL together form an obtuse angle and an acute angle unless the work travel path SL and the direction line DL are orthogonal to each other. The present preferred embodiment uses the acute angle as an entry angle $\theta$. FIG. 4 shows location deviations $\Delta d$, each of which is the distance between the center of gravity of the vehicle body 1 and the work travel path SL. The present preferred embodiment is arranged to, if (i) the location deviation $\Delta d$ is within an allowable location deviation range, and (ii) the entry angle $\theta$ is not larger than a limit entry angle, determine that the currently turning tractor satisfies an orientation condition under which the tractor is regarded as able to travel autonomously, that is, a condition for orientation in which the tractor can enter a work travel path SL while traveling autonomously.

The tractor is thus determined as able to travel autonomously if the location deviation $\Delta d$ is within the allowable location deviation range, and the entry angle $\theta$ is not larger than the limit entry angle, while the tractor is steered manually along a turn travel path TL. The tractor as the present preferred embodiment is shifted from manual travel to autonomous travel in response to the driver instructing the tractor to start autonomous travel while the tractor has been determined as able to travel autonomously.

Suppose a case where the driver has instructed the tractor to start autonomous travel immediately after the driver starts to manually cause the tractor to turn or has deactivated the function of starting autonomous travel in response to an instruction. In such cases, the tractor will immediately start autonomous travel to enter a destination turn travel path TL if the location deviation $\Delta d$ is within the allowable location deviation range, and the entry angle $\theta$ is not larger than the limit entry angle. The above destination turn travel path TL may, however, be not the turn travel path TL desired by the driver.

Figure 5:
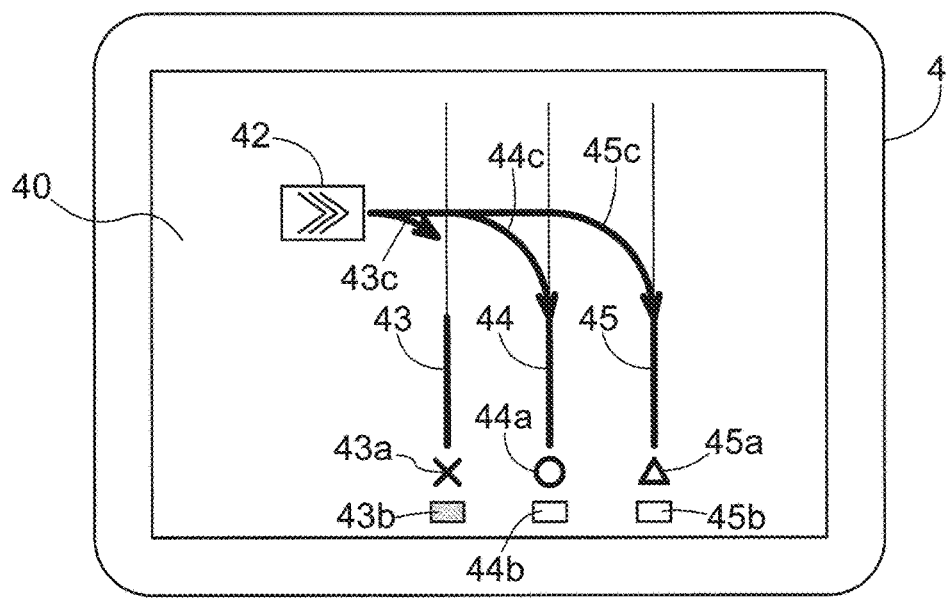
FIG. 5 is a diagram illustrating an image displayed on a touch screen when a tractor has ended autonomous travel along the originating travel path and is starting autonomous travel along a destination work travel path.

The tractor avoids such an inconvenience by causing the touch screen 40 of the data processing terminal 4 to display a notification screen as illustrated in FIG. 5. This notification screen allows the driver to (i) know which work travel paths SL are available for entry and (ii) confirm which work travel path SL to enter (that is, a path targeted for autonomous travel). The notification screen is generated on the basis of path notification information, which is generated by a control system of the tractor and which indicates, for example, how the position of the tractor is related to work travel paths SL.

The notification screen shows a vehicle icon 42, a first path icon 43, a second path icon 44, a third path icon 45, a first allowability icon 43a, a second allowability icon 44a, a third allowability icon 45a, a first path selecting button 43b, a second path selecting button 44b, a third path selecting button 45b, a first entry direction arrow 43c, a second entry direction arrow 44c, and a third entry direction arrow 45c.

The first path icon 43, the second path icon 44, and the third path icon 45 each indicate a work travel path SL that is present on the side of the traveling direction of the tractor having ended work travel along the originating work travel path SL and started turn travel and that is near the tractor. The vehicle icon 42 indicates the position of the tractor relative to the work travel paths SL indicated with the above three icons. The vehicle icon 42 includes an image of an arrowhead indicative of the direction in which the tractor is traveling.

The first path icon 43, the second path icon 44, and the third path icon 45 each function as an autonomous travel allowing lamp that, if the above condition for allowing shift to autonomous travel has been satisfied, blinks to notify the driver that the tractor is able to enter the work travel path SL through autonomous travel. The tractor may alternatively show, instead of the first path icon 43, the second path icon 44, and the third path icon 45, an autonomous travel allowing lamp for notifying the driver that the driver is allowed to shift the tractor from manual travel to autonomous travel.

Not all the work travel paths SL indicated with the first path icon 43, the second path icon 44, and the third path icon 45 are usable as a destination work travel path SL. The tractor cannot easily enter a work travel path SL very close to the originating work travel path SL through normal turn travel. Such a work travel path SL is unsuitable as a destination work travel path SL. FIG. 5 illustrates the following example: The work travel path SL indicated with the first path icon 43 is unsuitable as a destination work travel path SL. The first allowability icon 43a is thus in the shape of "x" (not allowed). The work travel paths SL indicated with the second path icon 44 and the third path icon 45 are, in contrast, each available as a destination work travel path SL. If, however, the driver selects the work travel path SL indicated with the third path icon 45 as the destination work travel path SL, the turn travel path TL will be long, which will decrease the work efficiency. Thus, the third allowability icon 45a is in the shape of "Δ" (allowed but not suitable), whereas the second allowability icon 44a is in the shape of "○" (available and recommended).

The first path selecting button 43b is for use to select the work travel path SL indicated with the first path icon 43 as the destination. The second path selecting button 44b is for use to select the work travel path SL indicated with the second path icon 44 as the destination. The third path selecting button 45b is for use to select the work travel path SL indicated with the third path icon 45 as the destination. FIG. 5 illustrates the following example: The work travel path SL indicated with the first path icon 43 is not allowed for entry. The first path selecting button 43b is thus grayed out and not operable. The second path selecting button 44b and the third path selecting button 45b are operable by the driver. If neither of the second path selecting button 44b and the third path selecting button 45b has been operated, the tractor automatically selects the work travel path SL indicated with the second path icon 44, which has been determined as a suitable destination.

Figure 6:
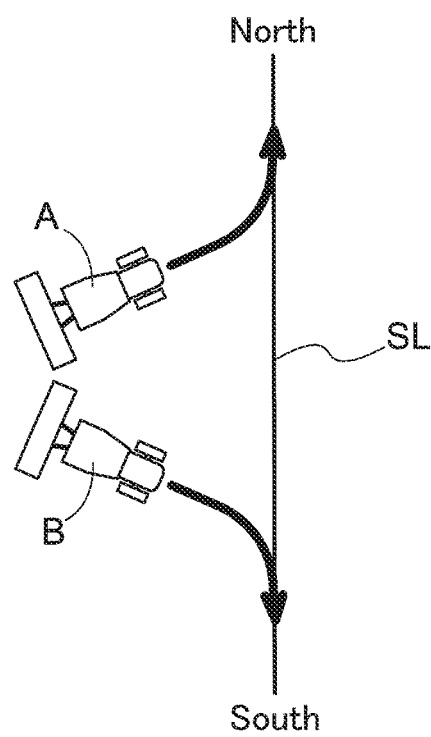
FIG. 6 is a diagram illustrating two different entry directions for a tractor entering a destination work travel path.

The first entry direction arrow 43c, the second entry direction arrow 44c, and the third entry direction arrow 45c each indicate a direction of entry into the corresponding one of the three work travel paths SL. The present preferred embodiment does not specify the travel direction of the tractor for a work travel path SL. The automatic control system of the tractor is thus capable of controlling the tractor so that the tractor travels autonomously in either direction along a work travel path SL. If the condition for allowing shift to autonomous travel has been satisfied while the tractor is oriented as indicated with "A" in FIG. 6, the tractor will enter the work travel path SL in a direction corresponding to the upward direction in FIG. 6 (northward). If the condition for allowing shift to autonomous travel has been satisfied while the tractor is oriented as indicated with "B" in FIG. 6, the tractor will enter the work travel path SL in a direction corresponding to the downward direction in FIG. 6 (southward). The first entry direction arrow 43c, the second entry direction arrow 44c, and the third entry direction arrow 45c each indicate such an entry direction, which the driver can check for whether the travel direction is as intended.

The first entry direction arrow 43c, the second entry direction arrow 44c, and the third entry direction arrow 45c for the present preferred embodiment each function as an operation button for giving the automatic control system an entry direction reversing instruction, which is for reversing the entry direction shown with the arrow. Long-pressing any one of the entry direction arrows 43c, 44c, and 45c gives an entry direction reversing instruction to the automatic control system. This causes the tractor with its current orientation to fail to satisfy the condition for allowing shift to autonomous travel, which in turn renders the work travel path SL corresponding to the entry direction arrow 43c, 44c, or 45c not allowed for entry.

Figure 7:
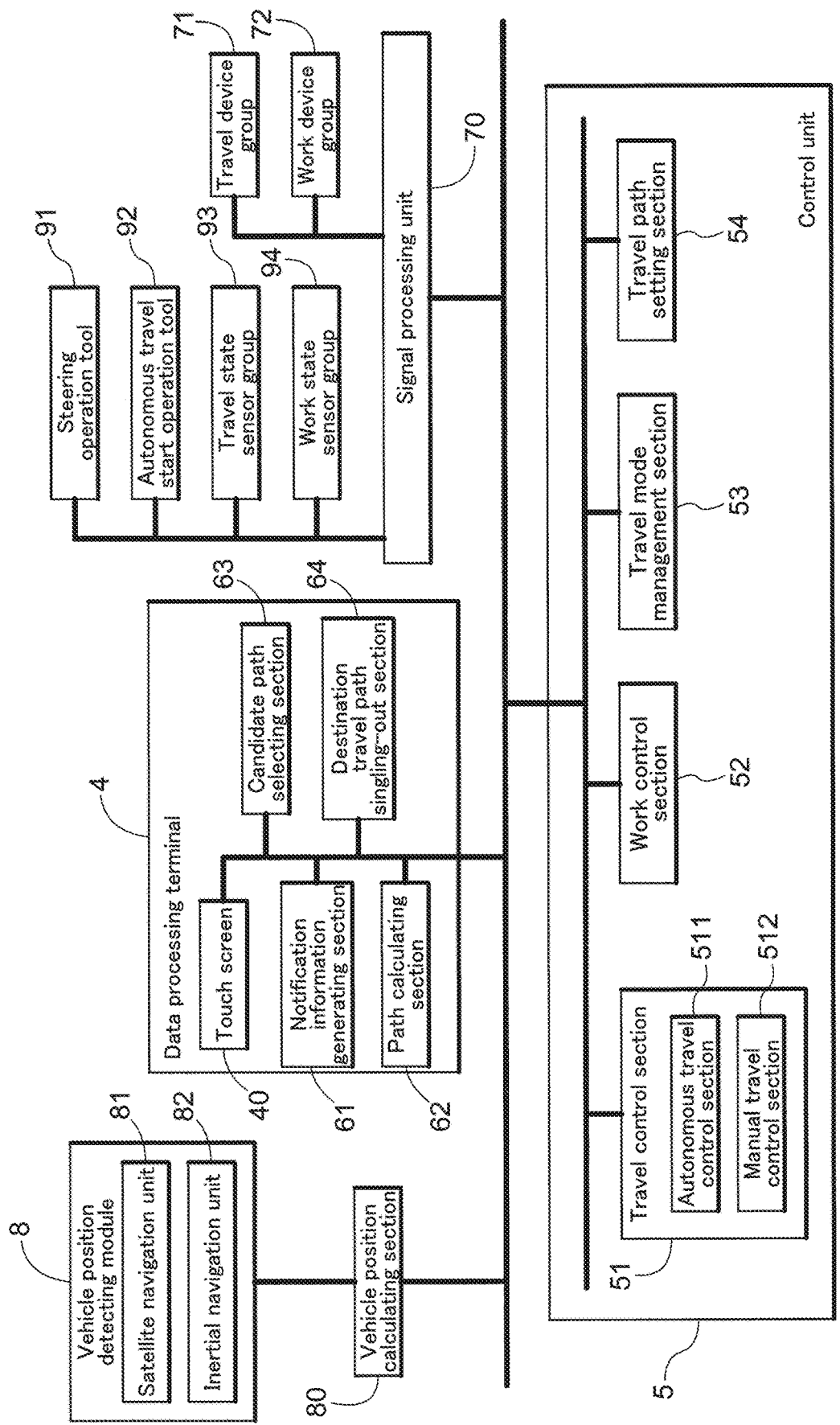
FIG. 7 is a functional block diagram illustrating a control system of a tractor.

With reference to drawings, the description below deals with those functional sections of the control system of a tractor which are particularly relevant to the present invention. FIG. 7 shows a control unit 5 as a core ECU as well as other ECUs each of which transmits and receives data or signals to and from the control unit 5. Those other ECUs include a vehicle position calculating section 80, a signal processing unit 70, and a data processing terminal 4.

The vehicle position calculating section 80 calculates the position of the tractor in the form of map coordinates (or agricultural field coordinates) on the basis of positioning data transmitted sequentially from the vehicle position detecting module 8. For the purpose of the calculation, the vehicle position calculating section 80 is capable of selecting, as the position of the tractor, the position of a particular portion of the vehicle body 1 (for example, the center of gravity of the machine body or the center of the tiller device 30). The vehicle position calculating section 80 also calculates, for example, the direction in which the vehicle body 1 is traveling (vehicle orientation) and/or its travel path on the basis of a plurality of pieces of data on the position of the tractor that the vehicle position calculating section 80 has calculated over time.

The signal processing unit 70 receives signals from, for example, a travel state sensor group 93, a work state sensor group 94, a steering operation tool 91, and an autonomous travel start operation tool 92. The signal processing unit 70 forwards an operation signal from the autonomous travel start operation tool 92 to the control unit 5 as a final autonomous travel start instruction for causing the tractor to switch from manual travel to autonomous travel to start autonomous travel. Operating the autonomous travel start operation tool 92 during turn travel, for instance, causes the tractor to start autonomous travel to enter a work travel path SL as illustrated in FIG. 5.

The signal processing unit 70 is connected to a travel device group 71, which is a group of devices related to travel, and a work device group 72, which is a group of devices related to work. The signal processing unit 70 generates a control signal on the basis of a control instruction from the control unit 5 and transmits the control signal to the travel device group 71 and the work device group 72.

The control unit 5 includes a travel control section 51, a work control section 52, a travel mode management section 53, and a travel path setting section 54. The travel control section 51 has, for example, an engine control function, a steering control function, and a vehicle speed control function. The travel control section 51 transmits a travel control signal via the signal processing unit 70 to the travel device group 71. The work control section 52 transmits a work control signal to the work device group 72 to control the operation of the tiller device 30.

The tractor is capable of traveling both while driving itself autonomously (that is, while performing harvesting work through autonomous travel) and while being driven manually (that is, while performing harvesting work through manual travel). In order for the tractor to have this capability, the travel control section 51 includes an autonomous travel control section 511 and a manual travel control section 512. The tractor is set to (i) an autonomous travel mode to drive itself autonomously and (ii) a manual travel mode to be driven manually. These travel modes are managed by the travel mode management section 53.

When the tractor is in the autonomous travel mode, the autonomous travel control section 511 generates a control instruction for autonomous steering or a vehicle speed change (including a stop). The control instruction for autonomous steering serves to correct an error in the position and/or orientation of the tractor calculated by the vehicle position calculating section 80 relative to the target work travel path SL set by the travel path setting section 54. The control instruction for a vehicle speed change is based on a preset vehicle speed value.

When the tractor is in the manual travel mode, the manual travel control section 512 generates a control instruction on the basis of an operation by the driver, and transmits the control instruction via the signal processing unit 70 to the travel device group 71 to control the travel device group 71.

The data processing terminal 4 receives, for example, information on the position of the tractor from the vehicle position calculating section 80 and information on travel and/or work from the control unit 5. The data processing terminal 4 converts such information into a numerical form and/or a graphic form and causes the touch screen 40 to provide the information for the driver. The data processing terminal 4 receives an instruction from the driver via an operation button on the touch screen 40. For this purpose, the data processing terminal 4 has a graphic user interface.

The data processing terminal 4 includes a notification information generating section 61, a path calculating section 62, a candidate path selecting section 63, and a destination travel path singling-out section 64. The path calculating section 62 calculates work travel paths SL in a work target area on the basis of a preregistered path calculating algorithm, and transmits information on the result of the calculation to the travel path setting section 54 of the control unit 5. The candidate path selecting section 63, when the tractor is shifted from work travel along a work travel path SL to turn travel as exemplified in FIG. 3, extracts those work travel paths SL which are present on the side toward which the tractor is turning, on the basis of the position of the tractor.

The candidate path selecting section 63 further selects, on the basis of, for example, the turn property of the vehicle body 1, work travel paths SL that the tractor is able to enter, as a destination work travel path candidate group. The destination travel path singling-out section 64 singles out a destination work travel path SL from among the group of candidates of destination work travel paths SL selected by the candidate path selecting section 63. The candidate path selecting section 63 assigns, to the destination work travel path SL singled out, an entry direction flag indicative of the direction in which the vehicle body 1 will enter the destination work travel path SL (see FIG. 6). If the destination travel path singling-out section 64 has singled out a plurality of destination work travel paths SL, the candidate path selecting section 63 prioritizes the plurality of destination work travel paths SL on the basis of (i) the current location deviation Δd (see FIG. 4) of the vehicle body 1 relative to each destination work travel path SL and (ii) the current entry angle θ (see FIG. 4) of the vehicle body 1, which is the direction in which the vehicle body 1 is traveling (orientation). A smaller value of the location deviation Δd or the entry angle θ results in a higher priority. Further, the destination travel path singling-out section 64, if the location deviation Δd is within the allowable location deviation range, and the entry angle θ is not larger than the limit entry angle, determines that the tractor can be shifted from manual travel to autonomous travel, and thus assigns an autonomous travel allowing flag to the destination work travel path.

The notification information generating section 61 generates path notification information for the touch screen 40 as an example notification device to display path information on a work travel path group near the tractor which work travel path group includes the destination work travel path SL singled out by the destination travel path singling-out section 64. Path notification information includes (i) an entry direction flag indicative of the direction in which the vehicle body 1 will enter the destination work travel path SL singled out, (ii) a priority for each destination work travel path SL singled out, and/or (iii) an autonomous travel allowing flag indicating that the condition has been satisfied for autonomous travel to enter the destination work travel path SL singled out. Such path notification information allows the touch screen 40 to display a graphic image as illustrated in FIG. 5.

Figure 8:
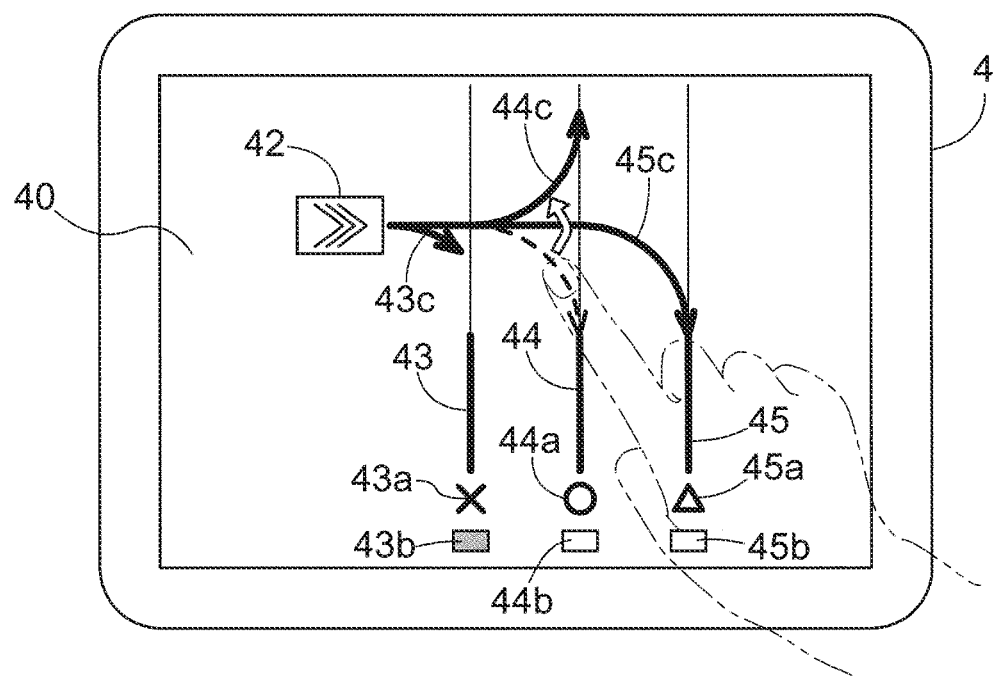
FIG. 8 is a diagram illustrating an operation on a touch screen for changing the direction of entry into a destination work travel path.

The present preferred embodiment is arranged such that the first entry direction arrow 43c, the second entry direction arrow 44c, and the third entry direction arrow 45c displayed on the touch screen 40 each also function as an entry direction reversing operation object for generating an entry direction reversing instruction, which is for reversing the direction in which the vehicle body 1 will enter a work travel path. An entry direction reversing instruction is generated in response to the driver dragging, to the opposite direction, the entry direction arrow 43c, 43c, or 43c for a work travel path for which the driver wants to reverse the entry direction and dropping it on the opposite side (see FIG. 8). The entry direction reversing instruction thus generated is transmitted to the destination travel path singling-out section 64. As a result, the limit entry angle for determining whether the tractor is able to travel autonomously is changed to a limit entry angle corresponding to the entry direction as reversed with the entry direction reversing instruction. The touch screen 40 may alternatively further display (i) a separate entry angle changing button for reversing the direction in which the tractor will enter a work travel path SL and/or (ii) a separate entry direction selecting button for selecting the direction in which the tractor will enter a work travel path SL.

Alternative Preferred Embodiments (1) The touch screen 40 may alternatively be capable of displaying not only an image as illustrated in FIG. 5 but also an image as illustrated in FIG. 3, that is, an image that shows an optimal turn travel path for the tractor to travel smoothly from the originating travel path to the destination work travel path SL.

(2) The preferred embodiment described above involves turn travel paths TL each in the shape of a combination of two half arcs and a straight line. This may alternatively be a combination of three or more arcs and a straight line. The turn travel paths TL may alternatively each involve not only forward travel but also a combination of forward travel and backward travel.

(3) The functional sections shown in FIG. 7 are grouped mainly for the purpose of description. The functional sections may alternatively each be integral with another functional section(s) or be divided further into a plurality of different functional sections. In addition, at least part of the functional sections included in the data processing terminal 4 may alternatively be included in the control unit 5.

INDUSTRIAL APPLICABILITY

The present invention is applicable to tractors as well as other agricultural field work vehicles such as combines and rice transplanters.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An agricultural field work vehicle configured to perform autonomous travel along a plurality of work travel paths that are parallel to one another and that are connected to one another via a turn travel path, the agricultural field work vehicle comprising:
    a vehicle position detecting module including a satellite navigation unit and an inertial navigation unit;
    at least one electronic control unit including:
        a vehicle position calculating section configured to calculate a position of the agricultural field work vehicle and an orientation of the agricultural field work vehicle based on positioning data transmitted from the vehicle position detecting module;
        an autonomous travel control section connected to a travel device group including a group of devices related to travel and configured to cause the agricultural field work vehicle to perform the autonomous travel along the plurality of work travel paths on a basis of the plurality of work travel paths and the position of the agricultural field work vehicle;
        a manual travel control section connected to the travel device group and configured to control manual travel of the agricultural field work vehicle along the turn travel path;
    a data processing terminal including:
        a candidate path selecting section configured to select at least one of the work travel path as one or more candidates the agricultural field work vehicle is able to enter from the turn travel path;
        a destination travel path singling-out section configured to single out a destination work travel path, which is a path targeted for a subsequent performance of the autonomous travel, from the work travel paths selected by the candidate path selecting section;
        a display to display path notification information, which is information on the plurality of work travel paths, which include the destination work travel path singled out by the destination travel path singling-out section; and
    an autonomous travel start operation tool for use to instruct the agricultural field work vehicle to switch from controlling the manual travel to controlling the autonomous travel.

2. The agricultural field work vehicle according to claim 1, wherein
    the path notification information includes information on a direction of entry of a vehicle body of the agricultural field work vehicle into the destination work travel path.

3. The agricultural field work vehicle according to claim 2, wherein:
    the display is configured to generate an entry direction reversing instruction for reversing the direction of the entry of which direction the display has displayed.

4. The agricultural field work vehicle according to claim 3, wherein
    the display and the user operation device are combined with each other in a form of a single touch screen.

5. The agricultural field work vehicle according to claim 1, wherein
    the destination work travel path singled out by the destination travel path singling-out section is changed to another work travel path among the one or more candidates in response to a user operation.

* * * * *